March 29, 1932.   A. J. FAUSEK ET AL   1,851,039
ELECTRODE HOLDER
Filed March 24, 1930   2 Sheets-Sheet 1
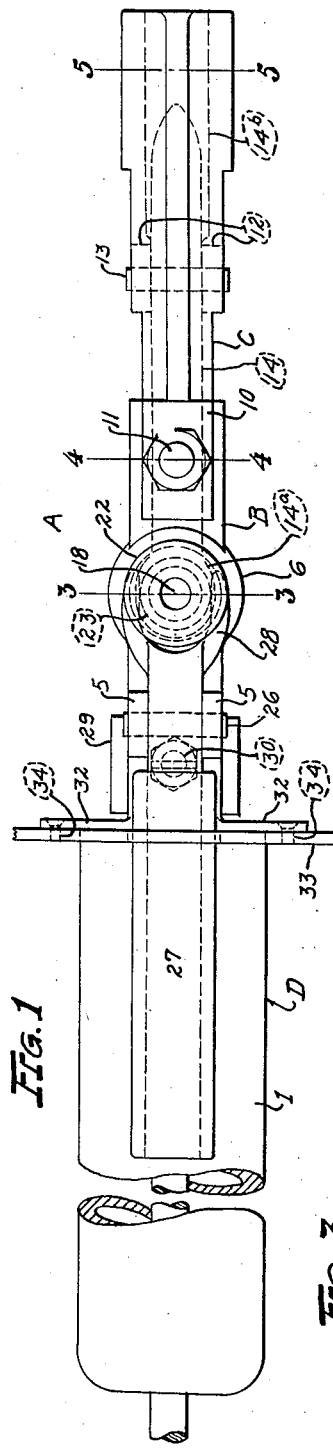
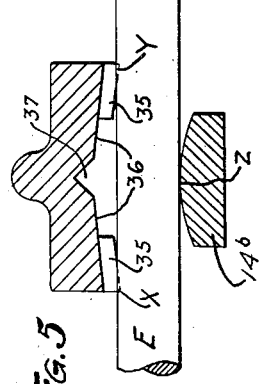
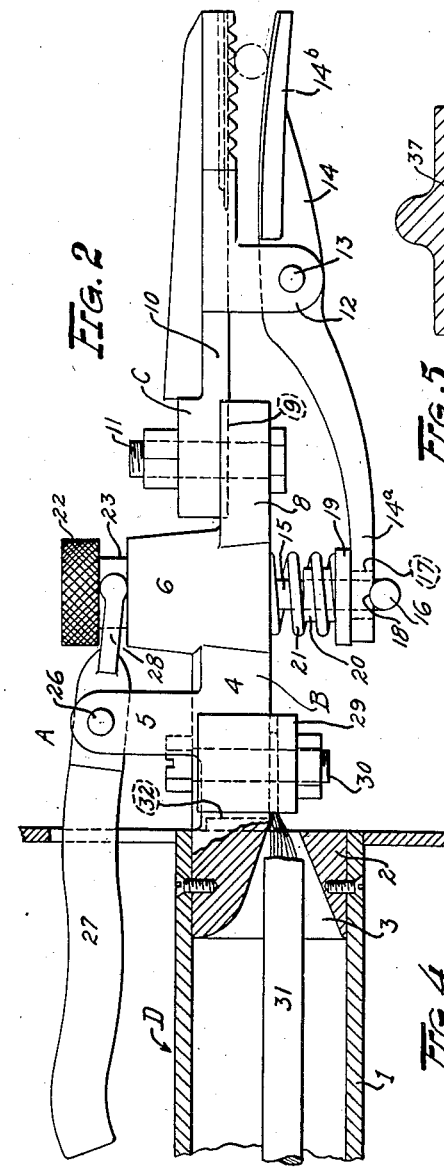
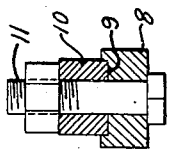
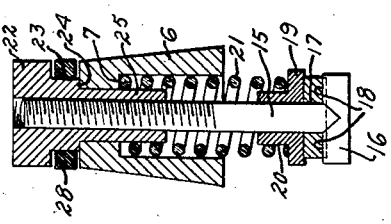
INVENTORS
A. J. FAUSEK
I. F. FAUSEK
BY E. M. Harrington
ATTORNEY

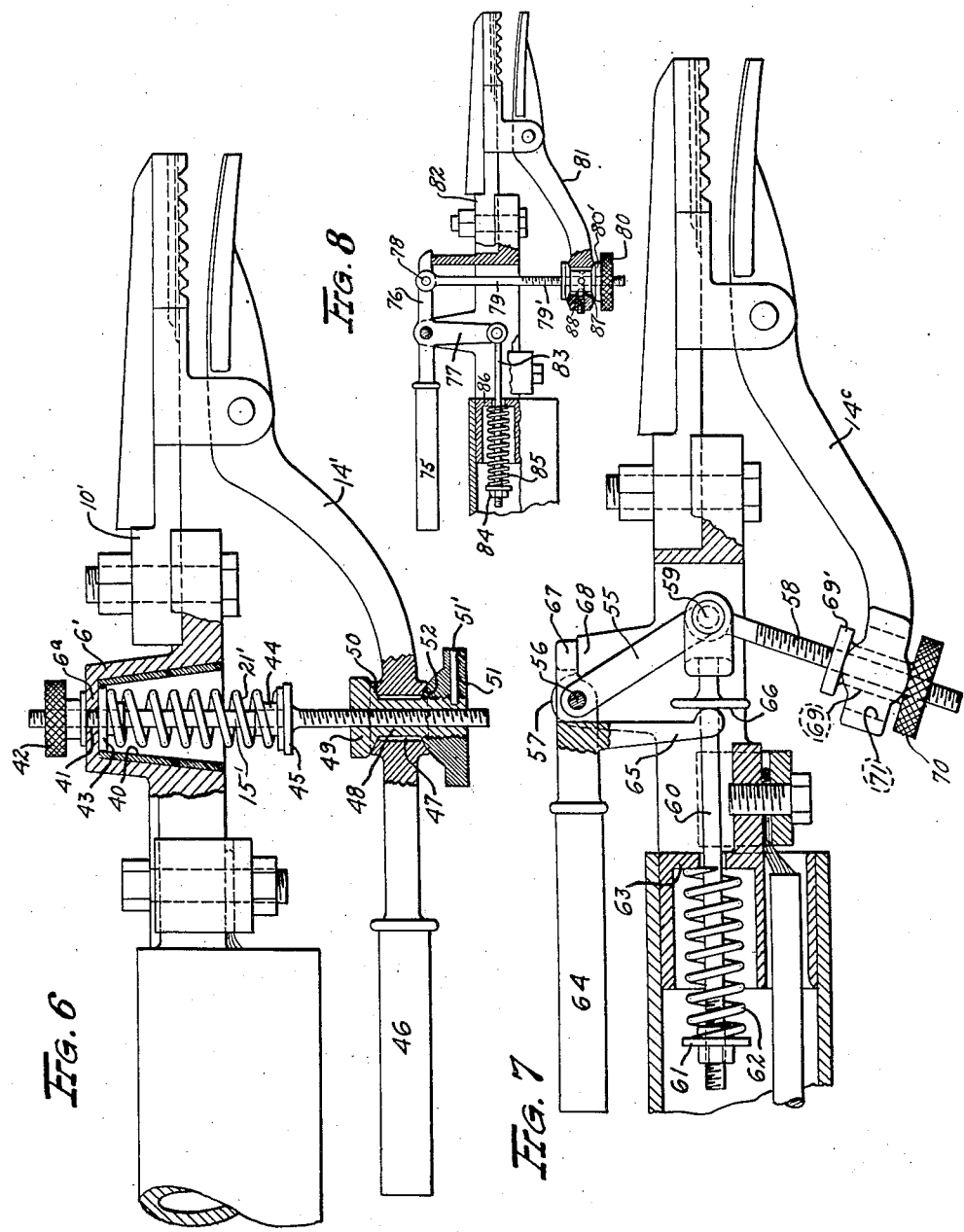

Patented Mar. 29, 1932

1,851,039

UNITED STATES PATENT OFFICE

ARTHUR J. FAUSEK AND IRWING F. FAUSEK, OF ST. LOUIS, MISSOURI

ELECTRODE HOLDER

Application filed March 24, 1930. Serial No. 438,369.

This invention relates generally to electrode holders of the type employed in electric arc welding and the predominant object of the invention is to provide an electrode holder of this type which is of such improved construction that the welder's task of using said holder is rendered less difficult, the useful life of the holder is increased, and the electrode gripping ability thereof is rendered more positive.

As is quite generally understood one of the electrodes of the apparatus employed in arc welding comprises a rod or bar of metal which is gripped by an electrode holder in the hands of the welder. The end portion of this electrode is moved with relation to the work being welded in a manner to cause the welding operation to be performed, said work being in electrical contact with the other electrode of the apparatus. An electrode holder of the type referred to must grip the electrode very securely and as a result of this requirement these electrode holders ordinarily include, each, an extremely strong coil spring which forces the jaws of the holder together for gripping the electrode.

The electrode which are gripped by the holders are of varying diameters, some thereof being of substantial diameter, and heretofore when the welder desired to introduce a new electrode in a holder, it has been necessary that he move the gripping jaws against the action of the strong coil spring, from a position where said gripping jaws were completely closed, to a position where said jaws were separated sufficiently to permit insertion therebetween of the electrode. In other words, heretofore it has been necessary for the welder to apply sufficient pressure each time an electrode was introduced into a holder to move the movable jaw a substantial distance against the action of a very strong spring and as this occurred a number of times during a working day the task of the welder was rendered quite difficult and tiresome.

In view of the foregoing we have produced the improved holder disclosed herein which is so constructed that the movable jaw thereof is adjustable with respect to the associated jaw independent of the hand operated means employed when said movable jaw is moved to permit introduction of an electrode between the jaws. This adjustable arrangement provides for maintaining the jaws of the holder in partially opened position and as a result of this situation the stroke or extent of movement of the movable jaw, when same is moved to permit insertion of an electrode between the jaws of the holder, is very materially reduced.

Another important feature of the present invention resides in the fact that the jaws of the holder are parts of a unit which is readily separable from the balance of the holder. This is important because the welders frequently accidentally touch the jaws of the holder to the other electrode of the apparatus and when this happens the jaws are usually burned beyond further use. Heretofore when the jaws were burned as described the entire holder had to be discarded, but in the use of our improved holder only the jaw unit of the holder would have to be replaced.

Still another important feature of the invention relates to the cross-sectional construction of the jaws of our holder which causes the electrode to be gripped at three points whereby the gripping action is much more secure than the flat grips formerly employed.

Figure 1 is a plan view of our improved electrode holder, a portion of the handle portion thereof being broken away to conserve space.

Figure 2 is a side elevation of the electrode holder illustrated in Figure 1, the fragment of the handle shown in this view being illustrated in section.

Figure 3 is a cross-section on line 3—3 of Figure 1.

Figure 4 is a cross-section on line 4—4 of Figure 1.

Figure 5 is an enlarged cross-section on line 5—5 of Figure 1.

Figure 6 illustrates a second form of the invention.

Figure 7 illustrates another form of the invention.

Figure 8 illustrates still another form of the invention.

In the drawings, wherein is shown for the purpose of illustration, merely, one embodiment of our invention, A designates the electrode holder generally, said electrode holder comprising an intermediate portion B, a jaw unit C, and a handle portion D. The handle portion D is comprised of a tubular element 1 of fiber or other suitable insulating material, and said tubular element is open at its opposite ends. The intermediate portion B of the holder includes an end portion 2 shaped to fit closely into the inner end of the tubular element 1 of the handle portion as shown in Figure 2, and this end portion 2 is provided with a tapered opening 3 formed therethrough, the larger end of said tapered opening being at the rear end of said end portion 2. The intermediate portion B of the holder includes, also, a bar portion 4 which is preferably formed integral with the end portion 2 and extends forwardly therefrom, said bar portion 4 having a pair of spaced apart, upwardly extended ears 5 formed thereon. 6 designates a hollow, upwardly extended portion which is preferably formed integral with the bar portion 4 of the intermediate portion of the holder, the opening through the portion 6 being reduced in diameter adjacent to the upper end thereof whereby a shoulder 7 is produced (Figure 3). Projected forwardly with respect to the portion 6 is an extension 8 which preferably is formed integral with the said portion 6, said extension being recessed as indicated at 9 in Figure 4.

The jaw unit C of the holder includes a fixed jaw 10 the inner end portion of which is seated in the recess 9 formed in the extension 8. The fixed jaw 10 is secured to the extension 8 by means of a single bolt 11 which passes through apertures formed through the extension and the inner end portion of said fixed jaw, the side walls of the recess 9 preventing pivotal movement of the fixed jaw about bolt referred to. Also the fixed jaw 10 is provided with downwardly extended, spaced apart ears 12. Pivotally secured at 13 to the ears 12 just referred to is the movable jaw 14 of the jaw unit, said movable jaw having a rearwardly extended portion 14ª located rearwardly of the pivotal joint 13, and a gripping portion 14ᵇ extended forwardly with respect to said pivotal point.

Extended longitudinally through the portion 6 of the intermediate portion of the holder is a rod 15 (Figures 2 and 3) the upper end portion of which is screw-threaded and which is provided with a transversely extended portion 16 whereby said rod is provided with a substantially T-shaped lower end portion. The rod 15 is extended through an elongated opening 17 formed through the rear portion of the movable jaw 14, the portions of the transverse portion 16 at opposite sides of the rod being seated in curved depressions 18 formed in the rear end portion of the movable jaw. 19 designates a fiber washer which is provided with an upwardly extended cylindrical portion 20. The washer 19 surrounds the rod 15 and contacts with the inner face of the rear end portion 14ª of the movable jaw 14. 21 designates a coil spring of substantial tension which is interposed between the shoulder 7 already referred to (Figure 3) and the washer 19, this coil spring being characterized by a tendency to move the rear end portion 14ª of the movable jaw in a direction away from the intermediate portion B of the holder.

22 designates an adjustment nut which is screwed on the screw-threaded upper portion of the rod 15. The upper portion of the adjustment nut 22 is of larger diameter than the remainder thereof and preferably its circumferential face is knurled, and located immediately beneath said knurled portion is an intermediate portion 23 of slightly reduced diameter. At the lower end of the intermediate portion 23 is a shoulder 24 (Figure 3) which contacts with the top face of the portion 6 of the intermediate portion B, and extended downwardly from said shoulder is a portion 25.

In view of the arrangement just described it is plain that by rotating the adjusting nut 22 the rod 15 may be moved longitudinally of its axis, thus imparting like movement to the movable jaw 14 whereby the gripping portion 14ᵇ thereof will be moved toward and away from the fixed jaw 10.

Pivoted at 26 to the ears 5 is an operating handle 27 which is provided at its forward end with a forked portion 28 which embraces the intermediate portion 23 of the adjusting nut 22. The top face of the forked portion 28 contacts with the lower face of the knurled portion of the adjusting nut, and the rear end portion of said operating handle 27 is provided with a covering formed of fiber or other suitable insulating material. The function of the operating handle 27 is to open the jaws of the holder and this is accomplished by depressing the rear portion of said handle whereby the adjusting nut 22 and with it the rod 15 will be moved upwardly with the result that the rear end portion 14ª of the movable jaw will be moved toward the intermediate portion B and the gripping portion 14ᵇ thereof will be moved away from the fixed jaw 10. The rear portion of the operating handle is preferably curved so as to fit within the hand of the user of the holder.

29 designates a substantially U-shaped clamp which is secured to the intermediate portion B of the holder by means of a bolt, 30. The electrical conductor 31 by which electrical energy is conducted to the holder is passed through the hollow handle portion D and the insulation of said conductor is cut away so as to expose the wires at the forward end of said conductor. These exposed wires are inserted between the clamp 29 and the bar portion 4 of the intermediate portion B and the bolt is tightened to cause the clamp to securely grip the wires of the conductor so that close electrical contact is made between the wires of the conductor and the bar portion 4. In connecting the electrical conductor 31 to the holder the tapered opening 3 (Figure 2) will guide the forward end portion of said conductor to its proper location at the clamp 29.

The bar portion 4 of the intermediate portion B is provided with outwardly extended ears 32 to which a disk 33 is fixed by means of fastening devices 34, said disk being formed of fiber or other suitable material and being extended to protect the hand of the user of the holder from the heat resulting from the welding operations.

By referring to Figure 5 of the drawings it will be noted that in cross-section the lower face of the fixed jaw 10 is concave while the top face of the movable jaw is convex. More specifically stated the lower face of the fixed jaw 10 is provided at its opposite side edges with teeth 35 which incline upwardly and inwardly from the side faces of said fixed jaw so that the outer ends of said teeth are in a horizontal plane which is lower than the remainder of said teeth. Also the face of the fixed jaw at the base of the teeth 35 is comprised of oppositely inclined portions 36, and at the transverse center of said fixed jaw a longitudinally extended, inverted V-shaped depression 37 is formed. When an electrode E is gripped between the jaws 10 and 14, said electrode is gripped at the three points X, Y, and Z (Fig. 5), hence the electrode is very securely and firmly held by said jaws. Also an electrode may be extended longitudinally between the jaws said electrode being seated in the depression 37.

In the use of our improved electrode holder the adjusting nut 22 may be rotated to adjust the gripping portion 14$^b$ of the movable jaw toward and away from the gripping portion of the fixed jaw. The result of this arrangement is that if an electrode of the approximate diameter of that illustrated by dotted lines in Figure 2 is being employed, the adjusting nut may be set so that when no electrode is positioned between the jaws 10 and 14 a space will be maintained between said jaws which is only slightly less than the diameter of the electrode being used. Then when the welder desires to introduce an electrode between the jaws it is merely necessary that he move the operating handle 27 enough to open the jaws the slight distance necessary to permit insertion of the electrode, and upon releasing said operating handle the coil spring will cause the jaws to securely grip the electrode. It is obvious, therefore, that the necessity for moving the movable jaw through a full stroke from the completely closed position is eliminated and the task of incident to the repeated insertion of electrodes into the holder is greatly simplified. It is plain also that the adjusting nut may be manipulated to properly space the jaws 10 and 14 for electrodes of any diameter up to the limit of movement of the movable jaw.

In the event the jaws of the holder are accidentally burned as already referred to herein, said damaged jaws may be replaced by simply removing the bolt 11, thus permitting removal of the jaw unit C and the substitution of a new jaw unit.

In the specification and claims of this application we have employed terms of orientation such as "upper", "lower", "forward", "rearward", etc., and it is to be understood that such terms as used for convenience of description and not in a limiting sense as the holder may be disposed in various positions.

In Figure 6 we illustrate a form of the invention which very closely resembles the form illustrated in Figures 1 to 5 inclusive; that is to say, the fixed jaw 10' of the holder illustrated in Figure 6 is provided with a hollow portion 6' in which a coil spring 21' is seated, and preferably we line the cavity within the hollow portion 6' with a suitable heat resisting material 40 such as asbestos. 15' designates a rod which extends longitudinally through the hollow portion 6', said rod being supported for sliding movement in an opening 41 formed in the wall 6$^a$ at an end of the cavity within the hollow portion 6'. The end portion of the rod 15' adjacent to the base of the hollow portion 6' is screwthreaded and a nut 42 is screwed on said screwthreaded portion, said nut contacting with the wall 6$^a$ to limit downward movement of the rod 15' with respect to the hollow portion 6'. The coil spring 21' is interposed between a fiber washer 43 located at the wall 6$^a$ of the hollow portion 6' and a similar fiber washer 44 which is in contact with a collar 45 on the rod 15' whereby said coil spring tends to move the rod 15' downwardly.

The movable jaw 14' is provided with an extended operating portion 46 and 47 designates an enlarged aperture formed through said movable jaw. The lower portion of the rod 15' is screwthreaded and 48 designates an internally screwthreaded sleeve which is screwed on said screwthreaded portion, said sleeve having an annular flange portion 49 which is provided with a rounded top face 50 which is seated in a correspondingly rounded depression formed at the upper end of the aperture 47. The lower end of the sleeve 48 is externally screwthreaded and a nut 51 is screwed on said externally screwthreaded portion, said nut having a rounded face 52 which is seated in a rounded depression formed at the lower end of the aperture 47. The nut 51 is made removable from the sleeve 48 to permit assembling of the holder and after the sleeve has been extended through the aperture 47 and the nut arranged in place on said sleeve, said nut is permanently fixed to the sleeve by a pin 51' so that thereafter it constitutes a fixed part thereof.

In the use of the device shown in Figure 6 the coil spring 21' forces the gripping portion of the movable jaw 14' toward the fixed jaw to grip an electrode positioned between said jaws, and when it is desired to separate said jaws the operating portion 46 of the movable jaw may be depressed against the action of the coil spring to move the gripping portion of the movable jaw away from the fixed jaw. Also in the use of this form of the invention the movable jaw may be adjusted with respect to the fixed jaw by screwing the nut 51 longitudinally of the rod 15' whereby the movable jaw will receive like movement because of the ball and socket-like connection between the unit comprised of the sleeve 48 and the nut 51 and said movable jaw.

In the form of the invention shown in Figure 7 we employ a link 55 which is pivoted at 56 to an ear 57 formed on the holder. At its lower end the link 55 is pivoted to a rod 58 at 59 which rod 58 is loosely connected at its lower end to the rear end of the movable jaw 14$^c$. 60 designates a rod which is pivotally connected at 59 to the connected ends of the link 55 and rod 58, said rod being provided with a collar 61 at its rear end. 62 designates a coil spring which is interposed between the collar 61 and a fixed part 63 of the handle structure of the holder, said coil spring being characterized by a tendency to force the rod 60 rearwardly. Pivoted to the ear 57 is an operating handle 64 which is provided with an extension 65 which contacts with a collar 66 on the rod 60, said operating handle 64 being provided with a second extension 67 adapted to contact with a stop 68 formed on the holder whereby outward movement of the rear end portion of the operating handle 64 is limited. The rod 58 is screwthreaded at its lower portion and 69 designates an internally screwthreaded sleeve which is screwed on said screwthreaded portion of said rod, said sleeve being provided with an annular flange portion 69' and having a nut 70 screwed on its lower externally screwthreaded portion as in the form of the invention illustrated in Figure 6. The rear end portion of the movable jaw 14$^c$ is provided with an elongated opening 71 through which the sleeve 69 extends and the nut 70 is permanently fixed to said sleeve after such extension of the sleeve through the opening referred to. The portions of the rear portion of the movable jaw at opposite sides of the opening 71 are interposed between and are in contact with the inner faces of the flange portion 69' and the nut 70.

In the use of the device illustrated in Figure 7 the link 55 and the rod 58 provide a toggle, the pivotal point 59 of which is moved forwardly when the operating handle 64 is moved toward the handle portion of the holder, such movement resulting from forward movement imparted to the rod 60 by the extension 65 of said operating handle moving against the collar 66. When the pivotal point of the toggle is moved forwardly as described, the rear end of the movable jaw will be moved toward the holder whereby the gripping portion of said movable jaw will be moved away from the gripping portion of the fixed jaw, and when the operating handle 64 is released the coil spring 62 will draw the pivotal point 59 rearwardly whereby the gripping portion of the movable jaw 14$^c$ will be moved forcibly toward the gripping portion of the fixed jaw.

In the use of the form of the invention shown in Figure 7 the gripping portion of the movable jaw may be adjusted toward and from the gripping portion of the fixed jaw by screwing the unit comprised of the sleeve 69 and nut 70 longitudinally of the rod 58 whereby the desired movement will be imparted to the movable jaw.

The form of the invention shown in Figure 8 includes an operating lever 75 which is provided with extensions 76 and 77 extended at an approximate right angle with respect to each other. The extension 76 has pivotally secured to it at 78 a rod 79, and this rod at its opposite end is connected by means of an adjustable connection 80 to the movable jaw 81. The adjustable connection 80 is constructed and arranged just as is the adjustable connection comprised of the sleeve 48 and nut 51 illustrated in Figure 6, said adjustable connection 80 being adjustable longitudinally of the screwthreaded portion 79' of the rod 79 to impart movement to the movable jaw 81 which will cause the gripping portion of said movable jaw to be adjusted toward and from the gripping portion of the fixed jaw 82. 83 designates a rod which is loosely attached to the extension 77 of the operating lever 75, said rod 83 having a collar 84 fixed at its rear end and being surrounded by a coil spring 85. The opposite ends of the coil spring contact with the collar 84 and a fixed part 86 of the holder whereby said coil spring tends to move the rod 83 rearwardly. The sleeve 80' is provided with circumferentially spaced depressions 87 adapted to receive an end portion of a spring pressed detent 88 when the movable jaw is adjusted for electrodes of different diameters whereby accidental rotation of said adjustable connection is prevented.

In the use of the form of the invention illustrated in Figure 8 the coil spring 85 draws the extension 77 rearwardly whereby the extension 76 tends to move in a direction parallel with the axis of the rod 79. This has the effect of maintaining the jaws 81 and 82 in a closed position. However, when it is desired to move the gripping portion of the movable jaw away from the gripping portion of the fixed jaw the rear portion of the operating lever 75 will be moved toward the handle portion of the holder whereby the coil spring 85 will be compressed by moving the extension 77 forwardly and the rod will be drawn upwardly to separate the gripping portion of the movable jaw from the gripping portion of the fixed jaw.

We claim:

1. An electrode holder including a pair of jaws, resilient means tending to maintain said jaws in a closed position, operating means for causing said jaws to assume an open position, and adjusting means for regulating the stroke of one of said jaws toward the other jaw.

2. An electrode holder including a pair of jaws, resilient means tending to maintain said jaws in a closed position, operating means for causing said jaws to assume an open position, and adjusting means for regulating the stroke of one of said jaws toward the other jaw, said adjusting means comprising a screwthreaded element arranged in cooperation with the jaw whose stroke is regulated.

3. An electrode holder including a fixed jaw and a movable jaw cooperable with each other in a manner to clamp an electrode therebetween, a coil spring tending to move the clamping portion of said movable jaw toward the clamping portion of the fixed jaw, means for moving the clamping portion of said movable jaw to an open position, and adjusting means for regulating the position of the clamping portion of the movable jaw with respect to the clamping portion of said fixed jaw.

4. An electrode holder including a fixed jaw and a movable jaw cooperable with each other in a manner to clamp an electrode therebetween, a coil spring tending to move the clamping portion of said movable jaw toward the clamping portion of the fixed jaw, means for moving the clamping portion of said movable jaw to an open position, and adjusting means for regulating the position of the clamping portion of the movable jaw with respect to the clamping portion of said fixed jaw, said adjusting means comprising a screwthreaded element arranged in cooperation with said movable jaw.

5. An electrode holder including a fixed jaw and a movable jaw cooperable with each other in a manner to clamp an electrode therebetween, a coil spring tending to move the clamping portion of said movable jaw toward the clamping portion of the fixed jaw, means for moving the clamping portion of said movable jaw to an open position, and adjusting means for regulating the position of the clamping portion of the movable jaw with respect to the clamping portion of said fixed jaw, said adjusting means including a screwthreaded element arranged in cooperation with said movable jaw, and an adjusting nut associated with said screwthreaded element and operable to move same longitudinally of its major axis.

6. An electrode holder including a fixed jaw and a movable jaw cooperable with each other in a manner to clamp an electrode therebetween, a coil spring tending to move the clamping portion of said movable jaw toward the clamping portion of said fixed jaw, adjusting means for regulating the position of the clamping portion of the movable jaw with respect to the clamping portion of the fixed jaw, and operating means cooperating with said adjusting means for moving the clamping portion of said movable jaw to an open position.

7. An electrode holder including a fixed jaw and a movable jaw cooperable with each other in a manner to clamp an electrode therebetween, a coil spring tending to move the clamping portion of said movable jaw toward the clamping portion of said fixed jaw, adjusting means for regulating the position of the clamping portion of the movable jaw with respect to the clamping portion of the fixed jaw, and operating means cooperating with said adjusting means for moving the clamping portion of said movable jaw to an open position, said adjusting means comprising a screwthreaded element arranged in cooperation with said movable jaw, and an adjusting nut associated with said screwthreaded element and operable to move same longitudinally, and said operating means comprising a pivoted lever arranged to engage said adjusting nut and operable to move said adjusting nut and said screwthreaded element to impart movement to said movable jaw.

8. An electrode holder including a pair of jaws, one of said jaws having a concave clamping face and the associated jaw having a convex clamping face whereby an electrode will be clamped at three points by said jaws, said concave clamping face being provided with teeth at its opposite side edges only, and being provided with a recess which extends longitudinally of said clamping face, and said convex face being curved longitudinally thereof.

In testimony whereof we have hereunto set our hands.

ARTHUR J. FAUSEK.
IRWING F. FAUSEK.